Patented Oct. 12, 1954

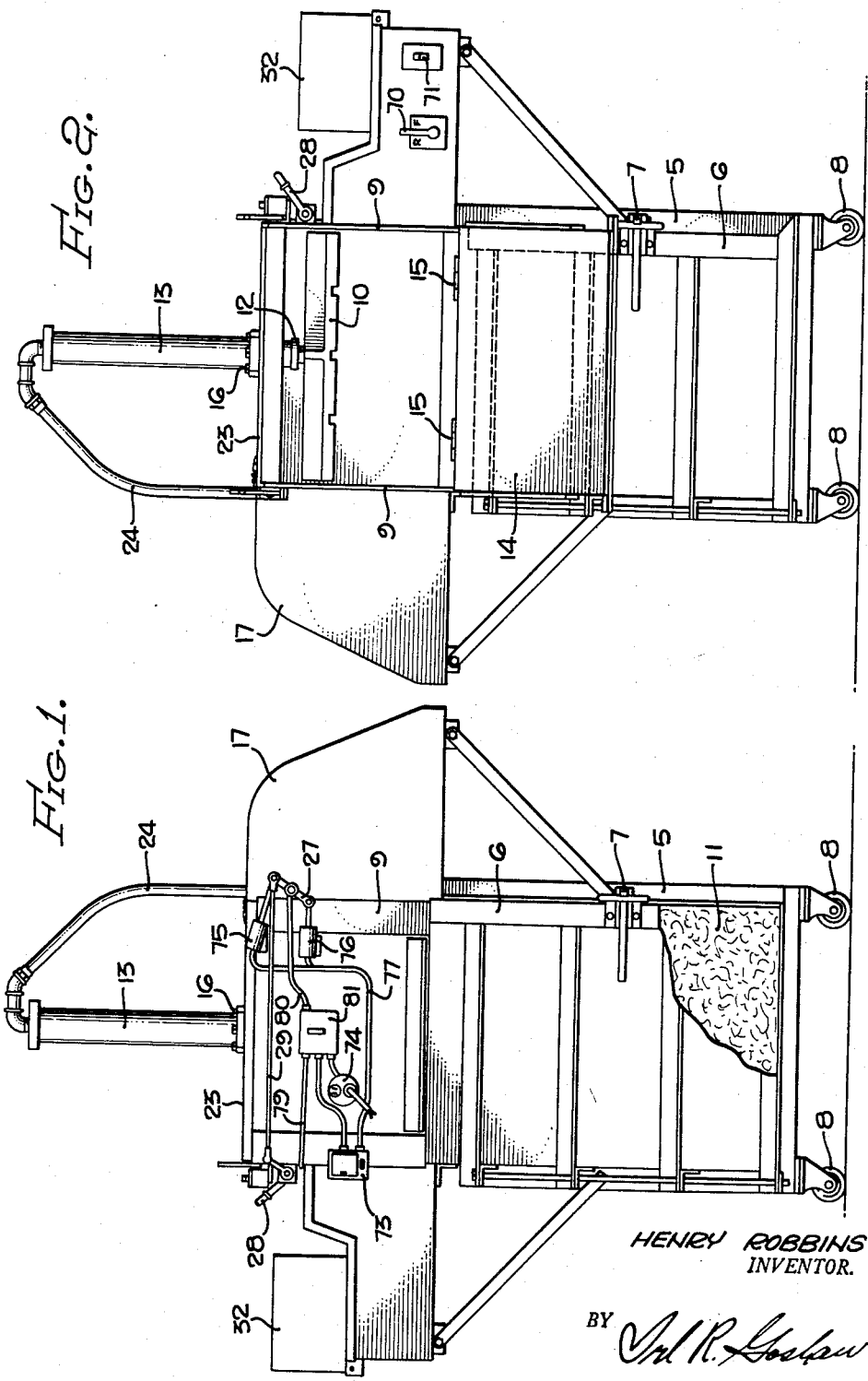

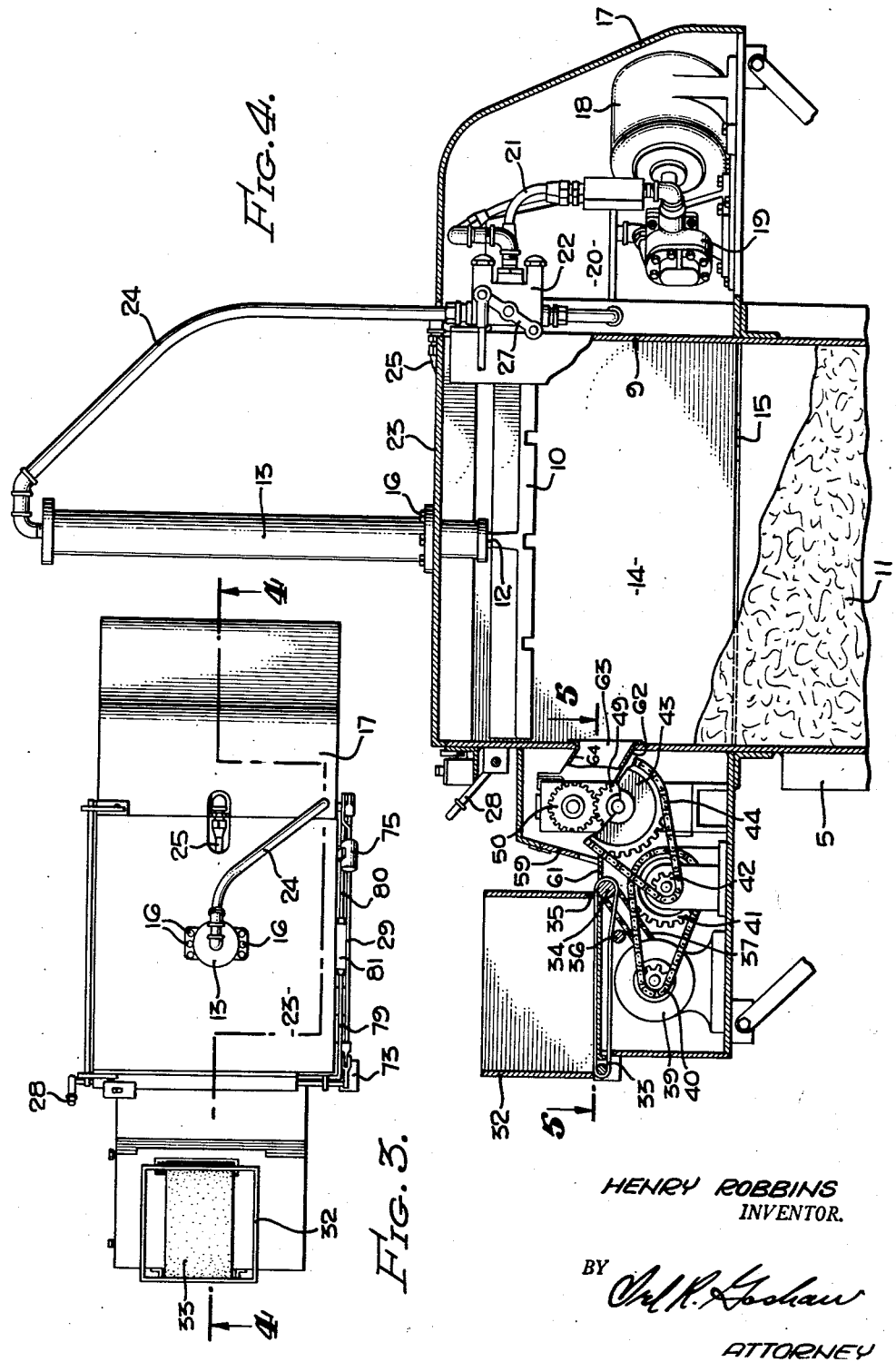

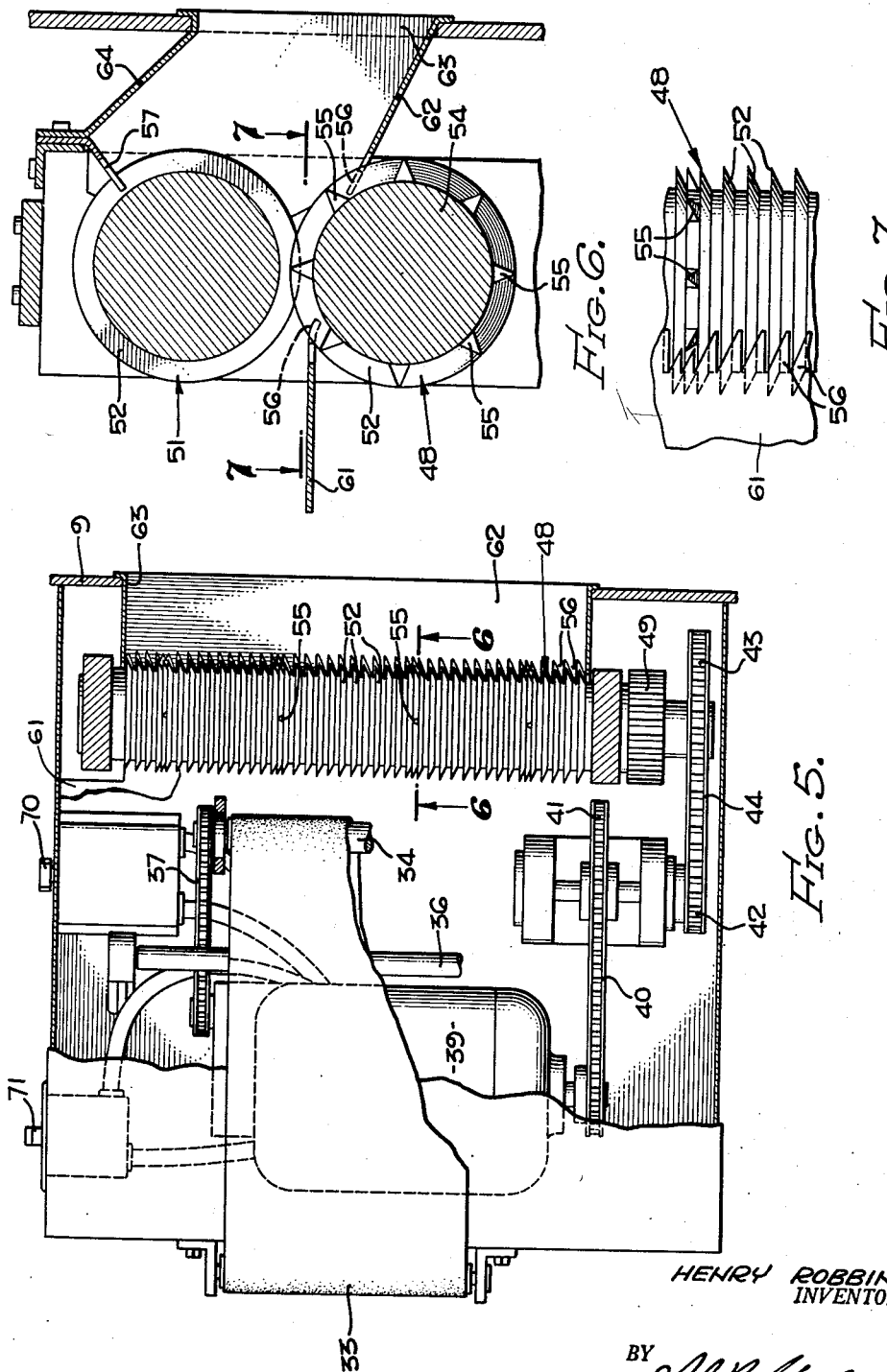

2,691,338

UNITED STATES PATENT OFFICE 2,691,338

PAPER SHREDDING AND BALING MACHINE

Henry Robbins, Van Nuys, Calif.

Application August 7, 1950, Serial No. 178,121

4 Claims. (Cl. 100—97)

This invention relates to a paper shredding and baling machine, and particularly to a shredder and baler combination which may be manually or automatically operated.

Paper shredders for destroying newspapers or other forms of paper, such as old letters, bills, receipts, etc., are well-known, and it is also well-known that shredded paper may be baled. The present invention is directed to a simplified combination shredder and baler which may be controlled manually or automatically. The automatic control permits the shredder to operate intermittently with the baler piston, so that the bale may be uniformly compressed in its entirety. The machine is also so constructed that the baler may be used without the shredder, if so desired.

The principal object of the invention, therefore, is to facilitate the shredding and baling of paper or similar material.

Another object of the invention is to provide an improved combination shredder and baler for paper.

A further object of the invention is to provide a simplified and rugged combination shredder and baler, the shredder and baler being automatically operated intermittently.

A still further object of the invention is to provide an improved paper shredder in combination with a baler for the shredded paper.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Fig. 1 is a front, elevational view with a portion broken away of the invention showing the automatic control therefor.

Fig. 2 is a rear, elevational view of the invention as shown in Fig. 1.

Fig. 3 is a plan view of the invention.

Fig. 4 is a cross-sectional view of the invention taken along the line 4—4 of Fig. 3.

Fig. 5 is a sectional view of the shredder portion of the invention taken along the line 5—5 of Fig. 4.

Fig. 6 is a sectional view of the shredding cutters taken along the line 6—6 of Fig. 5, and Fig. 7 is a sectional, detail view of one of the cutters taken along the line 7—7 of Fig. 6.

Referring now to the drawings, in which the same numerals identify like elements, a rectangular box housing 5, mounted on wheels 8, is provided with a bale exit door 6 having a latch 7. Through the cut-away section of the door, part of a bale 11 is shown. Mounted above the pressure hopper or compartment formed by the housing 5, is a box frame 9, in which is suspended or positioned a piston 10 connected to a pressure rod 12, which, in turn, is connected to a piston within the hydraulic cylinder 13. The cylinder is mounted on the upper surface plate 23 of frame 9 by bolts 16. A door 14 shown open is hinged at 15 and is used to insert paper in the hopper, which is to be baled without shredding.

At the right of Fig. 1 and to the left of Fig. 2 and shown in detail in Fig. 4, is the hydraulic compressor mechanism for operating the piston 10, and which is enclosed by housing 17. This mechanism includes a motor 18 driving a compressor 19 supplied with hydraulic fluid from a tank 20. The fluid is pumped upwardly through a pipe 21 into a valve 22, where it may either be directed through a pipe 24 to the top of cylinder 13 above the piston, or to the bottom of the cylinder and below the piston by a pipe 25. By operation of a lever 27, the fluid may be directed in either direction to raise or to lower the piston 10. The lever 27 may be operated manually by a handle 28 connected to a connecting rod 29. (See Fig. 1.) The lever 27 may also be operated automatically, as will be explained later.

To the left in Fig. 1 and to the right in Fig. 2 and shown in detail in Fig. 4, is the shredding portion of the mechanism. This comprises a feed hopper 32 which may be of legal letter size, or other appropriate size, and under which is a traveling belt 33 driven by a roller 34 over an idler roller 36, the paper passing out of the hopper through a slot 35. The roller 34 is driven by a chain 37 connected to a sprocket on a gear reduction box of motor 39. The motor 39 also drives a chain 40 which drives a gear 41 fixed to the shaft of a smaller gear 42. The small gear 42 drives a gear 43 by means of connecting chain 44.

As shown in Figs. 4 and 5, the gear 43 is on the shaft of a shredding roller 48, which is geared by means of gears 49 and 50, to a second shredding roller 51. The two shredding or cutter rollers are made up of a serial arrangement of tapered cutters 52 on a common axis, such as shown in detail in Fig. 7. The shredding rollers have their axes so related that the cutting edges of the cutters are interleaved and positioned closely adjacent one another, which cleanly and positively severs the paper passing between them. Spaced approximately every tenth cutter, is a row of teeth 55. These teeth are provided to contact the paper and feed it between the rollers 48 and 51.

Positioned between the discs 52 on roller 48 are scavenger fingers 56, which keep the paper from clogging the spaces between the cutting edges, similar fingers 57 being used for the upper roller 51. A ramp plate 62 has a serrated edge to strip the shredded papers from the cutters. A door 59 provides access to the cutters.

The shredder operates simply by placing paper in the feed hopper 32 where it falls on the belt 33. The belt 33 advances the paper through the slot 35 and on to an apron 61, from which it is fed between the rollers 48 and 51. The shredded paper then moves down the ramp 62 through the opening 63 into the pressure hopper formed in the housing 5. To enclose the upper portion of the passageway between the rollers 48 and 51 and the hopper, a wall 64 is provided.

Thus, to operate the machine, the operator may throw switch handle 70 to its forward position "F" and the shredder will function as just described, the lever 70 also causing reversal of the rollers when thrown to position "R" in order to clear them in case of clogging. The handle 70 is shown in its neutral position. A switch 71 only energizes the compressor motor 18. Thus, for manual operation, the shredder is started by operation of switch handle 70, and, after a predetermined amount of paper has been fed into the pressure hopper, the motor 39 is stopped by placing handle 70 in its neutral position. The compressor motor 18 is then energized by switch 71, and the handle 28 is manually thrown so that the piston 10 descends into the pressure hopper to compress the paper. Handle 28 is then thrown in the reverse direction to raise the piston 10, and, after it has been raised, the compressor motor 18 is de-energized. The shredder driving motor 39 is again energized by the switch handle 70 to shred another layer of paper into the hopper.

By the use of a time clock 73, having a time control mechanism such as shown in Lockhart U. S. Patent No. 2,168,843, which can be operated by normal house current when connected thereto at 74, energy is alternately supplied to electric solenoids 75 and 76 over conductors in conduit 77. The energization of one solenoid, such as 75, will actuate lever 27 and permit the hydraulic fluid to lower the piston 10, while operation of the solenoid 76 will also actuate lever 27 in the reverse direction and cause the piston 10 to rise. Over conduits 79 and 80, the respective motors 18 and 39 are alternately energized by electric actuation of a solenoid-operated switch 81 which energizes one motor when it de-energizes the other. Thus, when the machine is set for automatic operation by the time clock 73, it will first energize the shredder motor 39, which will operate according to the setting of timer 73, after which this motor will be de-energized and the compressor motor 18 will be energized. The lever 27 will then be actuated by solenoid 75 to lower the piston 10 and then solenoid 76 will be energized to raise the piston. This will continue alternately or intermittently until the bale is of the required size, or all the paper in feed hopper 32 has been sent through the shredder. The stroke of the piston is controlled by the pressure capacity of the compressor. Manual operation should not be attempted during automatic operation.

As mentioned above, if it is desired to bale unshredded paper or other material, it may be placed in the pressure hopper through door 14 and the piston operated in the usual manner. After a bale is formed, it may be tied with wire in the usual manner.

I claim:

1. A combination paper shredder and baler, comprising a bale forming compartment, a shredding unit adapted to discharge into said compartment, a piston adapted to move vertically into said compartment, means for hydraulically moving said piston in and out of said compartment, a compressor, a motor for driving said compressor, a valve for controlling the application of hydraulic fluid to said means for hydraulically moving said piston, electrical solenoids for operating said valve, a motor for driving said shredding unit, and electrical timing means for alternately energizing said solenoids and alternately operating said motors.

2. A combination paper shredder and baler in accordance with claim 1, in which said shredding unit includes a pair of interleaved cutter discs having their axes in a horizontal plane, one of said discs having spaced teeth for engaging and advancing paper between said discs.

3. A combination paper shredder and baler in accordance with claim 1, in which said shredding unit includes a pair of driven rollers in a vertical plane and having interleaved disc cutters, a horizontal feed belt, and spaced teeth on one of said rollers for engaging and advancing paper between said cutters.

4. A combination paper shredder and baler in accordance with claim 1, in which said shredding unit includes a pair of driven rollers having their axes in a horizontal plane, said rollers having interleaved cutting discs, and said electrical timing means includes a time clock, and electrically actuated switch means for alternately energizing one motor and de-energizing said other motor.

References Cited in the file of this patent

UNITED STATES PATENTS

| Number | Name | Date |
| --- | --- | --- |
| 748,231 | Stuart | Dec. 29, 1903 |
| 929,960 | Low | Aug. 3, 1909 |
| 1,132,731 | Peterson | Mar. 23, 1915 |
| 1,183,573 | LePage | May 6, 1916 |
| 1,193,410 | Murray | Aug. 1, 1916 |
| 1,255,623 | Meili | Feb. 5, 1918 |
| 1,340,971 | Munger | May 25, 1920 |
| 1,409,001 | Hurter | Mar. 7, 1922 |
| 1,456,265 | Brooks | May 22, 1923 |
| 2,030,982 | Grossenbacher | Feb. 18, 1926 |
| 2,347,845 | Schane | May 2, 1944 |
| 2,619,027 | Sykes | Nov. 25, 1952 |